United States Patent Office 2,693,613
Patented Nov. 9, 1954

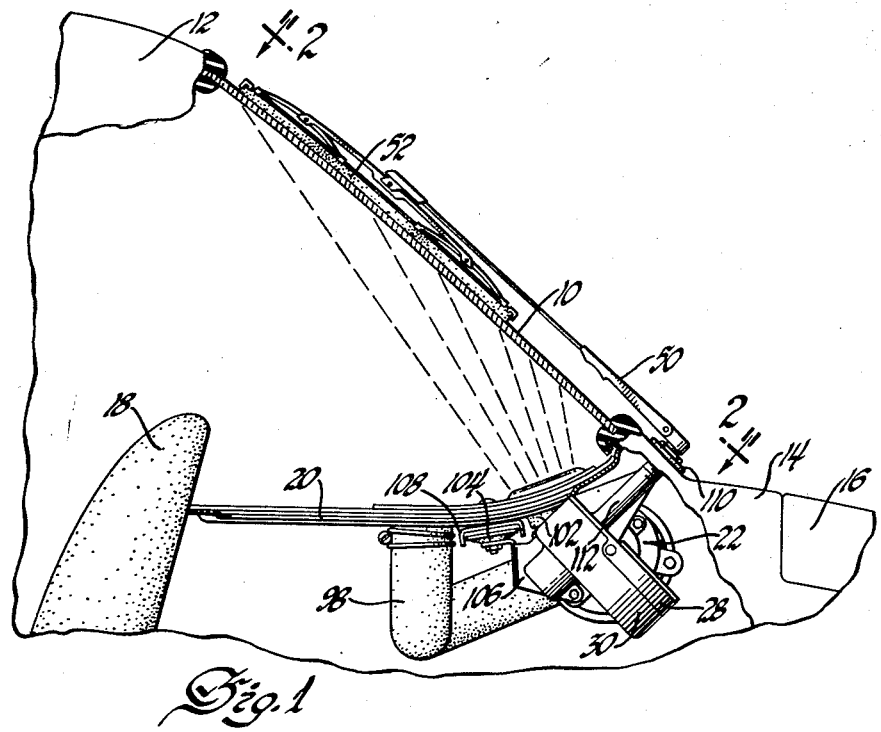
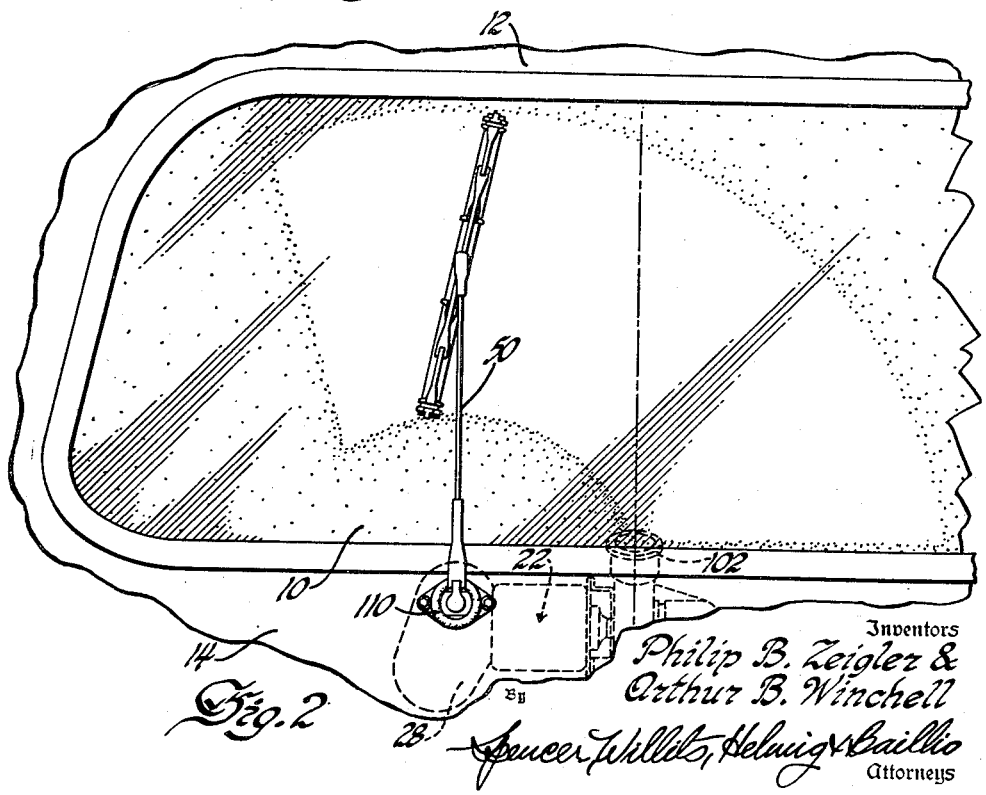

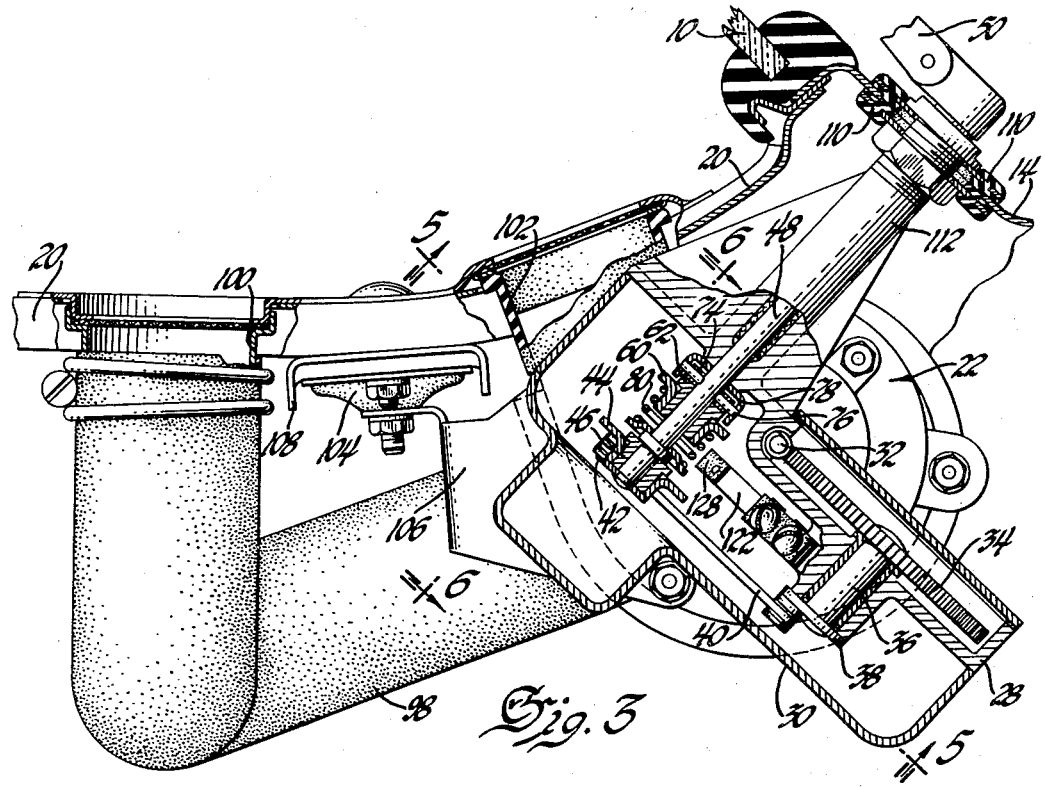
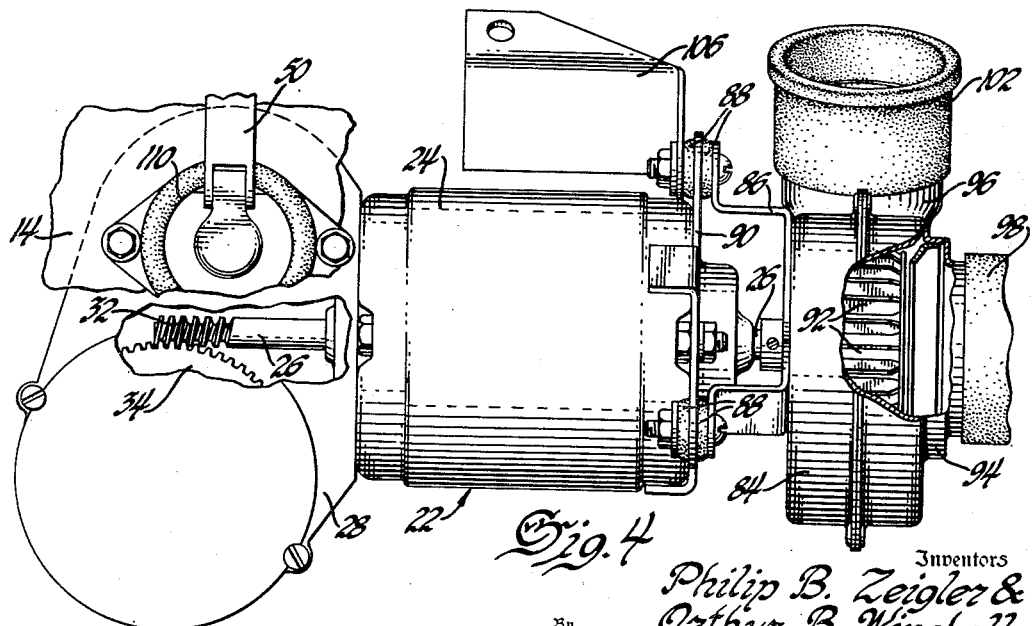

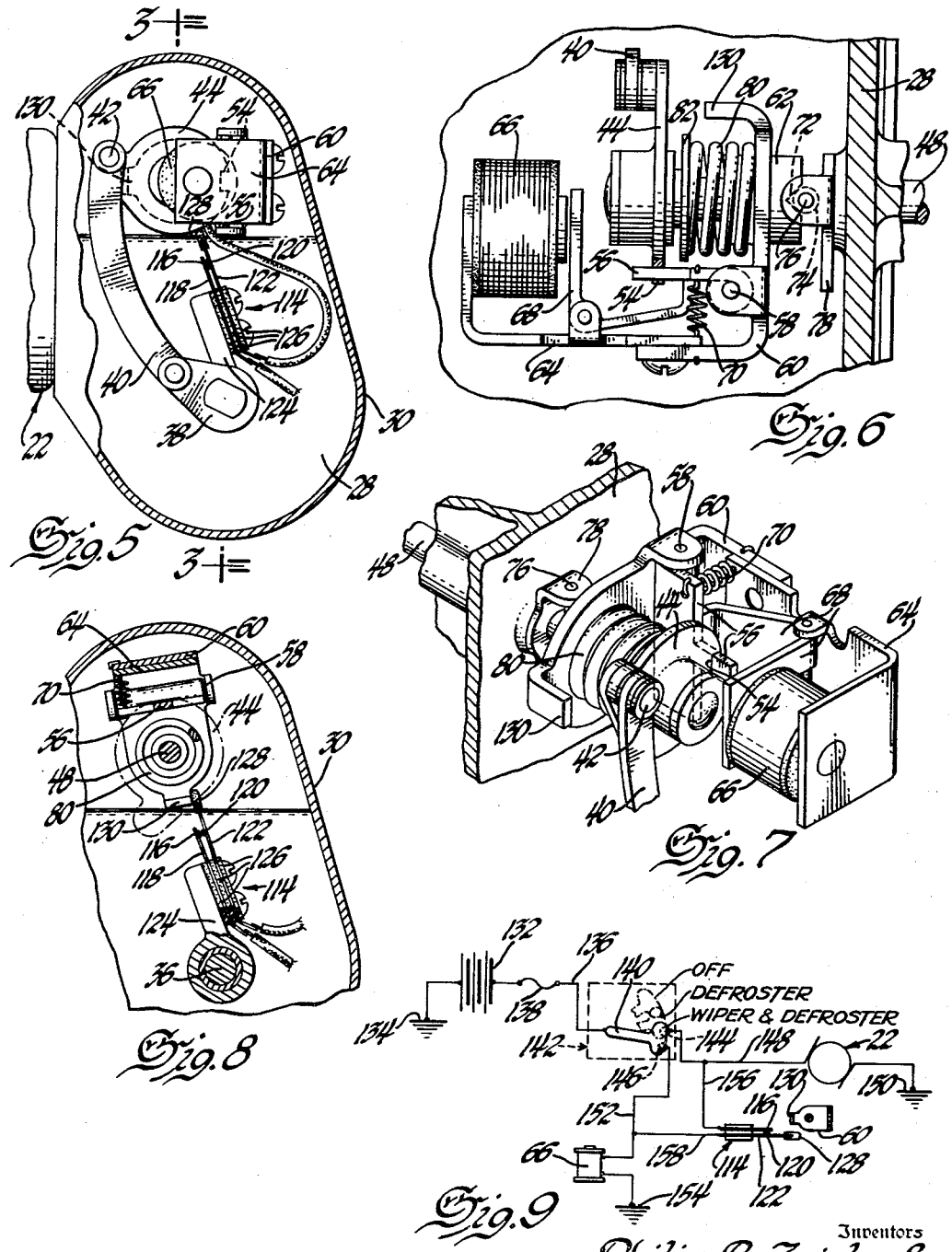

2,693,613

WINDOW WIPER AND DEFROSTER UNIT

Philip B. Zeigler, Saginaw, and Arthur B. Winchell, Jackson, Mich., assignors to General Motors Corporation, Detroit, Mich., a corporation of Delaware Application August 23, 1949, Serial No. 111,832

6 Claims. (Cl. 15—250.4)

This invention relates generally to a window wiper and defroster unit which is adapted particularly for cleaning the outside surface and defrosting the inside surface of the rear window of an automobile when vision is obscured by rain, snow or frost or when the window glass is clouded by moisture of condensation.

The present application relates more particularly to certain improvements in the wiper and defroster unit of a prior application of Philip B. Zeigler and Joseph J. Verbrugge, identified as Serial No. 95,316, filed May 25, 1949, wherein is disclosed an electrically driven device having a wiper blade to clean the exterior surface of the rear window and a blower to direct a stream of air over the interior surface of the window.

One object of the present invention is to provide a unit of this type in which the wiper blade and defroster blower cannot only be jointly operated as provided in the above application, but the defroster blower can be separately operated, if desired, without operation of the wiper blade.

A further object is to provide an electrically controlled clutch mechanism in the wiper blade drive with a control system and switch mechanism for the electric motor and clutch to provide for the manual control of the separate operation of the blower or joint operation of the blower and wiper blade and automatic parking of the wiper blade at one end of its stroke whenever the operation thereof is discontinued.

Other objects and advantages of this invention relating to the arrangement and operation of the related parts and to various details of construction will be apparent from the following description of the embodiment shown in the accompanying drawings.

Figure 1 is a fragmentary side view of a portion of the rear end of an automobile, with parts thereof broken away and in section, showing the relative location of the present window wiper and defroster unit.

Fig. 2 is a fragmentary elevation on line 2—2 of Fig. 1 with parts of the wiper and defroster unit shown in dotted lines.

Fig. 3 is an enlarged side elevation, with parts in section on line 3—3 of Fig. 5, of the unit and adjacent parts of the automobile.

Fig. 4 is an enlarged fragmentary rear elevation with parts broken away.

Fig. 5 is a detail section taken substantially on line 5—5 of Fig. 3.

Fig. 6 is an enlarged fragmentary section showing the clutch mechanism, taken substantially on line 6—6 of Fig. 3.

Fig. 7 is a fragmentary perspective of the clutch mechanism and parts shown in Fig. 6.

Fig. 8 is generally similar to Fig. 5, with parts broken away and in section to show the operation of the parking switch.

Fig. 9 is a schematic wiring diagram of the control circuit for the unit.

The mounting and many features of construction of the present unit are similar to the disclosure in the above-identified application and will only be generally described herein. In Fig. 1 a portion of a conventional automobile is shown as including the rear window 10, roof 12, rear body panel 14, trunk lid 16, the upper part of the rear seat back 18, and the package tray or shelf 20 extending from the rear seat back to the rear body panel.

The wiper and defroster unit is mounted beneath the package tray or shelf 20 and includes an electric motor, indicated generally at 22, which is provided with a motor housing 24 and a motor shaft 26 extending beyond both ends of the housing to be connected to the respective wiper and defroster mechanisms.

The wiper driving mechanism is located at one end of the motor within a gear housing 28 having a cover 30. A worm 32 on the motor shaft 26 meshes with a gear 34 on shaft 36 having a crank arm 38 connected to one end of a link 40. The other end of the link 40 is connected by a crankpin 42 to a rock arm 44 fixed on a bushing 46 which is rotatably mounted on the inner end of a rockshaft 48 extending through an elongated bearing in the gear housing 28. The unit is adapted to be mounted with the rockshaft 48 extending outwardly through the rear body panel 14 and a conventional wiper arm 50 provided with a blade assembly including wiper blade 52 is secured on the outer end of rockshaft 48.

It will be apparent that the rock arm 44 will be oscillated by the crank and link connection to the motor and the oscillating movement of arm 44 is adapted to be transmitted to the rockshaft 48, when desired, by an electrically controlled clutch through an overload clutch which disengages if some outside source prevents the wiper blade from passing through its normal stroke during the operation thereof.

As shown particularly in Figs. 6 and 7, the rock arm 44 is provided with a peripheral notch or recess 54 to receive the reduced free end of a latch or dog 56 which is pivotally mounted by pin 58 between spaced ears on a frame 60 fixed on a bushing 62 which is rotatably mounted on the rockshaft 48. A bracket 64 which is secured to the frame 60 supports a solenoid 66 and a pivoted lever 68 having one end adjacent the solenoid with the other end bent to engage the pivoted dog 56 which is connected to the frame 60 by a spring 70.

The spring 70 is adapted to normally hold the pivoted dog 56 out of engagement with the rock arm 44 with the lever 68 spaced away from the solenoid 66. When the solenoid 66 is energized the end of lever 68 adjacent the solenoid will be magnetically attracted and moved toward the solenoid so that the other end of the lever 68 urges the dog towards the rock arm 44 against the tension of spring 70 and when the end of the dog engages within the notch 54, as shown in Figs. 6 and 7, the frame 60 and the parts of the clutch mechanism carried thereby will be oscillated by the rock arm 44.

The oscillating movement of the frame 60 is transmitted through an overload clutch to the rockshaft 48. The bushing 62 to which the frame 60 is secured is formed with a V-shaped notch 72 at each side of the shaft 48 adapted to receive rollers 74 rotatably mounted on a pin 76 which extends through the shaft 48 and is secured between the bent ears on a plate 78. A compression spring 80 is interposed between a washer 82 on the shaft 48 and the frame 60 to normally retain the V-shaped notch 72 in driving engagement with the rollers 74.

Referring now to the defroster mechanism, a blower housing 84 is secured to the other end of the motor housing 24 by a bracket 86 which is connected through rubber grommets 88 to spaced ears on a mounting plate 90 secured to the motor housing. An air impeller or blower 92 within the housing 84 is secured on the end of the motor shaft 26 and is adapted to draw air through an inlet 94 in the housing and discharge the air peripherally through an outlet passage 96 in the housing. The inlet 94 is connected by a flexible rubber duct or tube 98 to an air intake fitting 100 in the shelf 20 so that the air supply for the blower is taken from the interior of the vehicle, and a rubber nozzle 102 is mounted on the outlet passage 96 and extends through the shelf 20 adjacent the rear window 10 to direct the stream of air from the blower over this window.

To absorb vibration and reduce the noise of operation, the wiper and defroster unit is preferably mounted, as is more fully disclosed in the above-identified prior application, by means of suitable rubber joints such as the vibration damper indicated generally at 104 between a supporting bracket 106 and a reinforcing channel 108 under the shelf 20, and vibration dampers 110 between the rear body panel 14 and an elongated bearing 112 for the rockshaft 48 which extends through the panel 14.

The control circuit for the present wiper and defroster unit includes a limit switch, indicated generally at 114 in Figs. 5 and 8, which functions whenever operation of the wiper is manually discontinued, as will be hereinafter described, to automatically open the circuit to the clutch-operating solenoid 66 to stop the movement of the wiper blade with the blade adjacent the molding at the bottom of the rear window at one end of its stroke.

This limit switch 114 is shown as having a contact 116 on contact arm 118 and a contact 120 on contact arm 122 with the contact arms spaced from one another and secured to a projection 124 on gear housing 28 within the cover 30 by means of insulating plates 126. The contact 120 is located between the ends of the contact arm 122 which may consist of suitable spring material and tensioned towards the contact 116 to normally maintain the contacts in engagement as shown in Fig. 5. The free end of contact arm 122 is provided with an extension 128 of insulating material which is located in the path of movement of a bent lug 130 on the frame 60 of the clutch mechanism previously described. The several parts are so arranged that the lug 130 will engage the extension 128 whenever the frame 60 is adjacent one end of its oscillating movement to bend the contact arm 122 and move contact 120 away from contact 116 as shown in Fig. 8. In this position, the frame 60 will be at the end of its movement in one direction and the wiper blade on the shaft 48 which is oscillated by the frame 60 will be at the end of its stroke adjacent the molding at the bottom of the rear window.

Referring now to Fig. 9, the control circuit is diagrammatically shown as including the usual automobile battery 132 grounded at 134 which is connected by conductor 136 having a conventional fuse 138 to the contact arm 140 of a switch indicated generally at 142 which is provided with fixed terminals 144 and 146. The switch 142 is adapted to be manually operated to either of three positions, namely, with the contact arm 140 engaging both terminals 144 and 146, engaging only the terminal 144, or out of engagement with both terminals. The terminal 144 is connected by conductor 148 to the motor 22 which is grounded at 150 while the terminal 146 is connected by conductor 152 to the clutch solenoid 66 grounded at 154. A conductor 156 extends from conductor 148 to contact 116 of limit switch 114 and the contact 120 of this switch is connected by conductor 158 to conductor 152.

When the contact arm 140 of manual switch 142 is in the position shown in full lines and designated as "Wiper & Defroster" in Fig. 9, the contact arm is in engagement with terminals 144 and 146 to supply current from the battery through conductor 148 to operate the motor 22 and through conductor 152 to the clutch solenoid 66 to engage the clutch that transmits oscillating movement to the frame 60, shaft 48 and wiper blade 52. In this position of the manual switch it will be noted that the limit switch 114 is not included in the operating circuit for either the motor or clutch solenoid so that the periodic opening of the limit switch by the lug 130 during oscillation of frame 60 will have no effect on the continuous operation of the wiper and defroster.

If now the contact arm 140 is moved to the position shown in dotted lines and designated as "Defroster," the contact arm engages only the terminal 144 to maintain the operating circuit for the motor 22 through conductor 148 but current to the clutch solenoid 66 can only be supplied through conductor 156, limit switch 114, and conductor 158 by what may be termed a parking circuit. This parking circuit will be automatically broken as soon as the lug 130 engages the arm 122 and moves the contact 120 of the limit switch away from the contact 116, as previously described, adjacent one end of the oscillating movement of frame 60 to deenergize the solenoid 66 and permit the clutch to disengage and thereby park the wiper blade at one end of its stroke.

After the clutch disengages the wiper drive, the motor 22 with defroster blower 92 will continue to operate until the contact arm 140 of the manual switch is moved to the position shown in dot and dash lines and designated as "Off" in which the contact arm does not engage either terminal. Although the manual switch 142 is only diagrammatically shown in Fig. 9, it should be noted that this switch is so constructed that if the contact arm 140 is to be moved directly from the "Wiper &

Defroster" position to the "Off" position, the engagement of the contact arm with terminal 144 is at least momentarily maintained after disengagement of terminal 146 as it passes through the "Defroster" position to provide for the automatic operation of limit switch 114 to park the wiper blade at the end of its stroke before the operating circuit to the motor 22 is broken. It will be apparent that the contact arm 140 can also be moved from the "Off" to "Defroster" position to operate only the motor with the defroster blower, if desired, without operation of the wiper blade.

Many features which are disclosed and described in the present application are more fully disclosed and claimed in the above-identified prior application and constitute no part of the present invention. Although a specific embodiment has been shown and described herein, it will be understood that the present invention is not to be limited to the exact details thereof but various changes and modifications may be made within the scope of this invention as defined in the claims appended hereto.

We claim:

1. In a wiper and defroster unit for a vehicle window, an electric motor having a shaft, a defroster mechanism including a blower connected to said motor shaft adapted to discharge air over the interior surface of the window, a wiper mechanism including a wiper shaft with driving connections between said motor shaft and wiper shaft to oscillate said wiper shaft, a wiper blade connected to the wiper shaft adapted to engage the exterior surface of the window, and an electrically controlled clutch in said driving connections for connecting and disconnecting said motor shaft from said wiper shaft.

2. In a wiper and defroster unit for a vehicle window, an electric motor having a shaft, a defroster mechanism including a blower connected to said motor shaft adapted to discharge air over the interior surface of the window, a wiper mechanism including a wiper shaft with a wiper blade connected to the wiper shaft adapted to engage the exterior surface of the window, and means to oscillate said wiper shaft including an oscillatory member with driving connections between said motor shaft and said member adapted to oscillate said member, and an electrically controlled clutch adapted to connect and disconnect said oscillatory member from said wiper shaft.

3. In a wiper and defroster unit for a vehicle window, an electric motor having a shaft, a defroster mechanism including a blower connected to said motor shaft adapted to discharge air over the interior surface of the window, a wiper mechanism including a wiper shaft with a wiper blade connected to said wiper shaft adapted to engage the exterior surface of the window, driving connections between said motor shaft and wiper shaft to oscillate said wiper shaft including a clutch adapted to connect and disconnect said motor shaft from said wiper shaft and a solenoid to control said clutch, and a control circuit including manual switch means to selectively connect either said motor or both said motor and solenoid with a source of electricity to provide for the separate operation of said defroster blower or the joint operation of said blower and wiper blade.

4. The elements set forth in claim 3 in which a limit switch is provided in the control circuit to automatically deenergize the clutch solenoid to disconnect the wiper shaft from the motor shaft at one end of the stroke of the wiper blade when the source of electricity is connected by said manual switch means to the motor to provide for the separate operation of the blower.

5. In a control system for an electric window wiper and defroster unit in which an electric motor is adapted to operate a defroster blower and to oscillate a wiper blade through a solenoid controlled clutch, a source of current, a manual switch having a movable contact arm connected to said source of current and two fixed terminals connected respectively to said motor and said solenoid, said contact arm being adapted in one position to engage both of said terminals to energize both said motor and solenoid to provide for joint operation of said defroster blower and wiper blade, and adapted in another position to engage only the terminal connected to said motor to provide for the separate operation of said blower.

6. In a control system for an electric window wiper and defroster unit in which an electric motor is adapted to operate a defroster blower and to oscillate a wiper blade through a predetermined stroke through a solenoid controlled clutch, a source of current, a manual switch having a movable contact arm connected to said source of current and first and second fixed terminals connected respectively by first and second conducting means to said motor and said clutch solenoid, and conducting means extending between said first and second conducting means and including an automatic limit switch having a fixed contact and a movable contact adapted to be periodically separated from said fixed contact at one end of the stroke of the wiper blade, said contact arm being adapted in one position to engage both of said terminals to energize said motor and solenoid for joint continuous operation of said defroster blower and wiper blade, and adapted to be moved to another position to engage only the first terminal for continuous operation of said motor and blower and operation of said wiper blade only until opening of said limit switch at one end of the wiper blade stroke.

References Cited in the file of this patent

UNITED STATES PATENTS

| Number | Name | Date |
|---|---|---|
| 1,134,283 | Mursch | Apr. 6, 1915 |
| 1,445,853 | Shaw | Feb. 20, 1923 |
| 2,005,581 | Gary | June 18, 1935 |
| 2,370,101 | Whitted | Feb. 20, 1945 |
| 2,520,678 | Findley | Aug. 29, 1950 |